United States Patent
Regev

(10) Patent No.: US 10,965,392 B2
(45) Date of Patent: Mar. 30, 2021

(54) ACTIVE NETWORK TAP SUPPORTING TIME SENSITIVE NETWORK (TSN) STANDARDS

(71) Applicant: Keysight Technologies, Inc., Santa Rosa, CA (US)

(72) Inventor: Alon Regev, Woodland Hills, CA (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 47 days.

(21) Appl. No.: 16/258,485

(22) Filed: Jan. 25, 2019

(65) Prior Publication Data

US 2020/0244382 A1    Jul. 30, 2020

(51) Int. Cl.
*H04J 3/06* (2006.01)
*H04L 12/26* (2006.01)
*H04L 12/933* (2013.01)

(52) U.S. Cl.
CPC .......... *H04J 3/0673* (2013.01); *H04J 3/0658* (2013.01); *H04J 3/0661* (2013.01); *H04J 3/0667* (2013.01); *H04J 3/0682* (2013.01); *H04L 43/106* (2013.01); *H04L 43/12* (2013.01); *H04L 49/109* (2013.01)

(58) Field of Classification Search
CPC ...... H04J 3/0635; H04J 3/0638; H04J 3/0658; H04J 3/0661; H04J 3/0667; H04J 3/0673; H04J 3/0682; H04L 43/106; H04L 43/12; H04L 49/109; H04L 43/0852
See application file for complete search history.

(56) References Cited

U.S. PATENT DOCUMENTS 6,868,069 B2    3/2005  Knobbe et al.
7,092,586 B2    8/2006  Vokey et al.
7,272,750 B2    9/2007  Sirbu
(Continued)

FOREIGN PATENT DOCUMENTS

CN    101447861 B    10/2011
CN    108737003 A    11/2018
(Continued)

OTHER PUBLICATIONS

Parry, Jack, et al. "A network forensics tool for precise data packet capture and replay in cyber-physical systems." Proceedings of the Australasian Computer Science Week Multiconference. 2016. (Year: 2016).*

(Continued)

*Primary Examiner* — Vivek Srivastava
*Assistant Examiner* — William C McBeth

(57) ABSTRACT

A method for providing a network tap supporting time sensitive network standards includes scanning, by an active network tap, received frames on a network port of the active network tap to identify timing synchronization messages of targeted message types. The method further includes identifying a timing synchronization message of the targeted message type. The method further includes modifying a timing value in the timing synchronization message to account for delay introduced by the active network tap. The method further includes forwarding the timing synchronization message with the modifying timing value to a destination time sensitive network node via an egress network port of the active network tap.

20 Claims, 6 Drawing Sheets

(56) References Cited

U.S. PATENT DOCUMENTS

| | | | |
|---|---|---|---|
| 7,649,912 B2 | 1/2010 | Balasubramanian et al. | |
| 7,881,209 B2 | 2/2011 | Beliles, Jr. et al. | |
| 8,718,482 B1 | 5/2014 | Roberts | |
| 8,767,565 B2 | 7/2014 | Dalmau et al. | |
| 9,106,353 B2 | 8/2015 | Hsueh et al. | |
| 9,130,945 B2 | 9/2015 | Smith et al. | |
| 9,288,777 B2 | 3/2016 | Hollabaugh et al. | |
| 9,380,070 B1 | 6/2016 | Cain et al. | |
| 9,686,169 B2 | 6/2017 | Formby et al. | |
| 9,699,051 B2 | 7/2017 | Rata et al. | |
| 9,736,804 B2 | 8/2017 | Regev | |
| 9,800,595 B2 | 10/2017 | Jackson | |
| 9,813,226 B2 | 11/2017 | Bergeron | |
| 9,923,656 B2 | 3/2018 | Tenea et al. | |
| 10,014,937 B1 | 7/2018 | Di Mola et al. | |
| 10,019,333 B2 | 7/2018 | Regev | |
| 10,158,441 B1 | 12/2018 | Butterworth et al. | |
| 10,425,321 B2 | 9/2019 | Joseph et al. | |
| 10,609,054 B2 | 3/2020 | Jackson | |
| 10,623,297 B2 | 4/2020 | Regev | |
| 2002/0065929 A1 | 5/2002 | Kamentsky et al. | |
| 2002/0093917 A1 | 7/2002 | Knobbe et al. | |
| 2003/0105976 A1 | 6/2003 | Copeland, III | |
| 2003/0200483 A1 | 10/2003 | Sutton | |
| 2004/0190547 A1 | 9/2004 | Gordy et al. | |
| 2005/0207387 A1* | 9/2005 | Middleton | H04J 3/0682 370/347 |
| 2007/0268938 A1 | 11/2007 | Dowd | |
| 2009/0217075 A1 | 8/2009 | Adar et al. | |
| 2009/0231191 A1 | 9/2009 | Wu et al. | |
| 2009/0257354 A1 | 10/2009 | Hannel et al. | |
| 2010/0039157 A1 | 2/2010 | Kaeriyama et al. | |
| 2010/0098111 A1 | 4/2010 | Sun et al. | |
| 2011/0064091 A1* | 3/2011 | Darras | H04L 43/106 370/458 |
| 2011/0170534 A1 | 7/2011 | York | |
| 2011/0199133 A1 | 8/2011 | Yamada | |
| 2011/0211473 A1 | 9/2011 | Matityahu et al. | |
| 2011/0268097 A1 | 11/2011 | Agrawala et al. | |
| 2012/0166327 A1 | 6/2012 | Amicangioli | |
| 2012/0275317 A1 | 11/2012 | Geva | |
| 2012/0320933 A1* | 12/2012 | Magee | H04J 3/0673 370/503 |
| 2013/0080817 A1 | 3/2013 | Mihelic | |
| 2013/0086250 A1 | 4/2013 | Eskicioglu et al. | |
| 2013/0094515 A1 | 4/2013 | Gura et al. | |
| 2013/0100832 A1* | 4/2013 | Flinn | H04L 43/106 370/252 |
| 2013/0170507 A1 | 7/2013 | Hsueh et al. | |
| 2013/0173778 A1 | 7/2013 | Hsy et al. | |
| 2013/0212439 A1 | 8/2013 | Stevens et al. | |
| 2013/0259049 A1 | 10/2013 | Mizrahi | |
| 2013/0265886 A1 | 10/2013 | Leong | |
| 2013/0278312 A1 | 10/2013 | Getzin et al. | |
| 2013/0329595 A1 | 12/2013 | Scholz | |
| 2013/0343207 A1 | 12/2013 | Cook et al. | |
| 2013/0347103 A1 | 12/2013 | Veteikis et al. | |
| 2014/0006610 A1 | 1/2014 | Formby et al. | |
| 2014/0164860 A1 | 6/2014 | Kim | |
| 2014/0185632 A1 | 7/2014 | Steiner et al. | |
| 2014/0226984 A1* | 8/2014 | Roberts | H04J 3/0673 398/66 |
| 2014/0247839 A1* | 9/2014 | Kingsley | H04L 43/12 370/503 |
| 2014/0269337 A1 | 9/2014 | Gintis | |
| 2014/0297852 A1 | 10/2014 | Shimizu et al. | |
| 2014/0304505 A1 | 10/2014 | Dawson | |
| 2014/0317288 A1 | 10/2014 | Krueger et al. | |
| 2014/0321285 A1 | 10/2014 | Chew et al. | |
| 2014/0344930 A1 | 11/2014 | Foley | |
| 2015/0016274 A1 | 1/2015 | Holland | |
| 2015/0023168 A1 | 1/2015 | Kotecha et al. | |
| 2015/0023170 A1 | 1/2015 | Kakadia et al. | |
| 2015/0103828 A1 | 4/2015 | Chandhoke et al. | |
| 2015/0103832 A1 | 4/2015 | Chandhoke et al. | |
| 2015/0103836 A1 | 4/2015 | Chandhoke et al. | |
| 2015/0103848 A1 | 4/2015 | Chandhoke et al. | |
| 2015/0245306 A1 | 8/2015 | Boehlke | |
| 2015/0281025 A1 | 10/2015 | Wallbaum et al. | |
| 2016/0065434 A1 | 3/2016 | Janakiraman | |
| 2016/0110211 A1 | 4/2016 | Karnes | |
| 2016/0110212 A1 | 4/2016 | Karnes | |
| 2016/0170440 A1* | 6/2016 | Aweya | H04J 3/0667 713/503 |
| 2016/0285575 A1 | 9/2016 | Holmeide | |
| 2016/0301589 A1 | 10/2016 | Rata et al. | |
| 2016/0301599 A1 | 10/2016 | Porfiri et al. | |
| 2016/0306726 A1 | 10/2016 | Regev | |
| 2016/0309434 A1 | 10/2016 | Regev | |
| 2016/0315756 A1 | 10/2016 | Tenea et al. | |
| 2017/0041126 A1 | 2/2017 | Bergeron | |
| 2017/0085581 A1 | 3/2017 | Jackson | |
| 2017/0331748 A1 | 11/2017 | Mangin | |
| 2018/0070373 A1 | 3/2018 | Muench | |
| 2018/0160424 A1 | 6/2018 | Cavalcanti et al. | |
| 2018/0184438 A1 | 6/2018 | Cavalcanti et al. | |
| 2018/0191642 A1 | 7/2018 | Biederman et al. | |
| 2018/0227067 A1 | 8/2018 | Hu et al. | |
| 2018/0237039 A1 | 8/2018 | Mong et al. | |
| 2018/0295144 A1 | 10/2018 | Jackson | |
| 2018/0302330 A1 | 10/2018 | Bush | |
| 2018/0302331 A1 | 10/2018 | Bush | |
| 2018/0309655 A1 | 10/2018 | Joseph et al. | |
| 2018/0309656 A1 | 10/2018 | Regev | |
| 2018/0316592 A1 | 11/2018 | Ellegaard | |
| 2020/0252424 A1 | 8/2020 | Regev | |
| 2020/0366588 A1 | 11/2020 | Bergeron | |

FOREIGN PATENT DOCUMENTS

| | | |
|---|---|---|
| DE | 10 2018 109 689 A1 | 10/2018 |
| EP | 3 284 244 B1 | 12/2019 |
| EP | 3284244 B1 | 12/2019 |
| WO | WO 2011/144263 A1 | 11/2011 |
| WO | WO 2016/168063 A1 | 10/2016 |
| WO | WO 2016/168064 A1 | 10/2016 |
| WO | WO 2017/052714 A1 | 3/2017 |

OTHER PUBLICATIONS

"1588v2 Sync and Delay_Req Messages Format," http://support.huawei.com/hedex/pages/EDOC1000105968300081 25/05/EDOC1000105968300081 25/05/resources/message/cd_feature_1588v2_format-sync.html, pp. 1-2 (Downloaded Jan. 9, 2019).

Notice of Allowance and Fee(s) Due for U.S. Appl. No. 15/647,207 (dated Jan. 15, 2020).

Non-Final Office Action for U.S. Appl. No. 15/647,207 (dated May 15, 2019).

Notice of Allowance and Fee(s) Due for U.S. Appl. No. 15/498,452 (dated May 10, 2019).

Notice of Allowance and Fee(s) Due and Examiner-Initiated Interview Summary for U.S. Appl. No. 15/482,672 (dated Dec. 18, 2019).

Decision to grant a European patent pursuant to Article 97(1) EPC for European Patent Application Serial No. 16780482.2 (dated Nov. 21, 2019).

Alhady et al., "Time-aware Traffic Shaper using Time-based Packet Scheduling in Intel I210," International Journal of Research and Engineering, vol. 5, No. 9, pp. 494-499 (Sep.-Oct. 2018).

Wisniewski et al., "Seamless Schedule Switching in Time Triggered Ethernet based Communication Systems," ResearchGate, pp. 1-11 (Nov. 2015).

Thangamuthu et al., "Analysis of Ethernet-Switch Traffic Shapers for In-Vehicle Networking Applications," Design, Automation & Test in Europe Conference & Exhibition, pp. 1-6 (2015).

Thangamuthu, S., Analysis of Automotive Traffic Shapers in Ethernet In-Vehicular Networks, Eindhoven University of Technology, pp. 1-89 (2014).

(56) References Cited

OTHER PUBLICATIONS

Boiger, Christain, "Time Aware Shaper," IEEE 802 Plenary, Deggendorf University of Applied Sciences, pp. 1-9 (May 2012).
Advisory Action and AFCP 2.0 Decision for U.S. Appl. No. 15/647,207 (dated Nov. 27, 2019).
Decision to grant a European patent pursuant to Article 97(1) EPC for European Patent Application Serial No. 16780481.4 (dated Sep. 12, 2019).
Commonly-assigned, co-pending U.S. Appl. No. 16/264,127 for "Methods, Systems, and Computer Readable Media for Detecting and Mitigating Effects of Timing Attacks in Time Sensitive Networks (TSNs)," (Unpublished, filed Jan. 31, 2019).
Non-Final Office Action for U.S. Appl. No. 15/482,672 (dated Nov. 16, 2018).
Non-Final Office Action for U.S. Appl. No. 15/498,452 (dated Nov. 5, 2018).
Moussa et al., "A Detection and Mitigation Model for PTP Delay Attack in an IEC 61850 Substation", IEEE Transactions on Smart Grid, vol. 9, No. 5, pp. 3954-3965 (Sep. 2018).
Communication of the Extended European Search Report for European Patent Application Serial No. 16780481.4 (dated Sep. 6, 2018).
Communication of the Extended European Search Report for European Patent Application Serial No. 16780482.2 (dated Aug. 9, 2018).
Communication of European publication number and information on the application of Article 67(3) EPC for European Patent Application Serial No. 16849136.3 (dated Jul. 4, 2018).
Notice of Allowance and Fee(s) Due for U.S. Appl. No. 14/688,644 (dated Feb. 28, 2018).
Notice of Allowance and Fee(s) Due for U.S. Appl. No. 14/809,513 (dated Nov. 7, 2017).
"Time-Sensitive Networking Task," Wikipedia, the free encyclopedia, https://en.wikipedia.org/wiki/Time-Sensitive_Networking, pp. 1-7 (Aug. 29, 2017).
Non-Final Office Action for U.S. Appl. No. 14/688,644 (dated Jul. 26, 2017).
Teener, "IEEE 802 Time-Sensitive Networking: Extending Beyond AVB," Accessed on wayback machine, https://web.archive.org/web/20140724130142/http://standards.ieee.org/events/automotive/08_Teener_TSN.pdf, pp. 1-30 (Jul. 24, 2017).
Notice of Allowance and Fee(s) Due for U.S. Appl. No. 14/819,337 (dated Jun. 21, 2017).
Notice of Allowance and Fee(s) Due and Examiner Initiated Interview Summary for U.S. Appl. No. 14/860,630 (dated Jun. 13, 2017).
Non-Final Office Action for U.S. Appl. No. 14/809,513 (dated May 30, 2017).
"IEEE Standard for Local and metropolitan area networks—Bridges and Bridged Networks—Amendment 29: Cyclic Queuing and Forwarding," IEEE Computer Society, IEEE Std 802.1QchTM-2017, pp. 1-28 (May 18, 2017).
Notice of Allowance and Fee(s) Due for U.S. Appl. No. 14/688,630 (dated Apr. 12, 2017).
Non-Final Office Action for U.S. Appl. No. 14/819,337 (dated Mar. 2, 2017).
Notice of Allowance and Fee(s) Due for U.S. Appl. No. 14/685,552 (dated Mar. 1, 2017).
Notice of Allowance and Fee(s) Due for U.S. Appl. No. 13/933,661 (dated Feb. 17, 2017).
Non-Final Office Action for U.S. Appl. No. 14/860,630 (dated Dec. 19, 2016).
Non-Final Office Action for U.S. Appl. No. 14/685,552 (dated Oct. 20, 2016).
Non-Final Office Action for U.S. Appl. No. 14/688,630 (dated Oct. 17, 2016).
Non-Final Office Action for U.S. Appl. No. 13/933,661 (dated Sep. 27, 2016).
Notification of Transmittal of the International Search Report and the Written Opinion of the International Searching Authority, or the Declaration for International Application No. PCT/US2016/040532 (dated Sep. 12, 2016).
Notification of Transmittal of the International Search Report and the Written Opinion of the International Searching Authority, or the Declaration for International Application No. PCT/US2016/026534 (dated Jul. 8, 2016).
Notification of Transmittal of the International Searh report and the Written Opinion of the International Searching Authority, or the Declaration for International Application No. PCT/US2016/026533 (dated Jul. 8, 2016).
"IEEE Standard for Local and metropolitan area networks—Bridges and Bridged Networks—Amendment 26: Frame Preemption," IEEE Computer Society, IEEE Std 802.1QbuTM-2016, pp. 1-51 (Jun. 30, 2016).
Final Office Action for U.S. Appl. No. 13/933,661 (dated Apr. 12, 2016).
Non-Final Office Action for U.S. Appl. No. 13/933,661 (dated Dec. 14, 2015).
"IEEE Standard for Local and metropolitan area networks—Bridges and Bridged Networks—Amendment 25: Enhancements for Scheduled Traffic," IEEE Computer Society, IEEE Std 802.1QbvTM-2015, pp. 1-55 (Dec. 5, 2015).
"External Bypass Switches," Ixia, White Paper, 915-6688-01 Rev. B, pp. 1-5 (Dec. 2015).
"IEEE Standard for Local and metropolitan area networks—Bridges and Bridged Networks—Amendment 24: Path Control and Reservation," IEEE Computer Society, IEEE Std 802.1QcaTM-2015, pp. 1-105 (Sep. 3, 2015).
"Network Time Protocol," Wikipedia, https://en.wikipedia.org/wiki/Network_Time_ Protocol, pp. 1-7 (Jul. 3, 2015).
Finn, "802.1Qav + P802.1Qbv Time-gated Shapers," Cisco System, IEEE 802 Pleanry, pp. 1-12 (Nov. 5, 2014).
"High Density Modular Fiber Tap," Ixia, http://www.ixiacom.com/products/net-optics-flex-tap, pp. 1-4 (Jul. 2014).
Watt et al., "Understanding and Applying Precision Time Protocol," Power and Energy Automation Conference, pp. 1-7 (Mar. 2014).
"Ixia Anue 3500—Mobile Backhaul Testing Solution," Ixia Data Sheet, pp. 1-5 (Dec. 2013).
Arnold, "What Are All of These IEEE 1588 Clock Types," http://blog.meinbergglobal.com/2013/10/21/ieee1588clocktypes/, News and Tutorials from Meinberg, pp. 1-6. (Oct. 21, 2013).
"AN-1838 IEEE 1588 Boundary Clock and Transparent Clock Implementation Using the DP83640," Application Report, Texas Instruments, pp. 1-9 (Apr. 2013).
"AN-1728 IEEE 1588 Precision Time Protocol Time Synchronization Performance," Application Report, SNLA098A, Texas Instruments, pp. 1-10 (Apr. 2013).
Boiger, "Deterministic Ethernet—IEEE 802.1 standards for real-time process control, industrial automation, and vehicular networks," IEEE 802 Tutorial, pp. 1-72 (Nov. 12, 2012).
Boiger, "Time Aware Shaper," Deggendorf University of Applied Sciences, IEEE 802.1 Pleanry, pp. 1-12 (Sep. 2012).
Spirent, "Precision Time Protocol (PTP) IEEE 1588," YouTube "alantalkstech", https://www.youtube.com/watch?v=yw-gd01aOYg, pp. 1-11 (Dec. 7, 2011).
"IEEE Standard for Local and metropolitan area networks—Timing and Synchronization for Time-Sensitive Applications in Bridged Local Area Networks," IEEE Computer Society, IEEE Std 802.1ASTM-2011, pp. 1-274 (Mar. 30, 2011).
Ullmann et al., "Delay Attacks—Implication on NTP and PTP Time Synchronization", ISPCS 2009 International IEEE Symposium on Precision Clock Synchronization for Measurement, Control, and Communication, pp. 1-6 (Oct. 12-16, 2009).
"Precision Clock Synchronization The Standard IEEE 1588", Hirschmann, White Paper, pp. 1-20. (Feb. 2009).
Eidson, "IEEE-1588 Standard for a Precision Clock Synchronization Protocol for Networked Measurement and Control Systems—A Tutorial," Agilent Technologies, pp. 1-94 (Oct. 2005).
"IEEE 1588 Precise Time Protocol: The New Standard in Time Synchronization" Microsemi Power Matters, White Paper, pp. 1-10 (Copyright 2005-2017).
Non-Final Office Action for U.S. Appl. No. 15/482,672 (dated Jun. 14, 2019).
Communication under Rule 71(3) EPC for European Patent Application Serial No. 16 780 481.4 (dated May 7, 2019).

(56) References Cited

OTHER PUBLICATIONS

Final Office Action for U.S. Appl. No. 15/647,207 (dated Sep. 12, 2019).
Communication under Rule 71(3) EPC Intention to Grant for European Patent Application Serial No. 16 780 482.2 (dated Jul. 9, 2019).
Communication of European publication number and information on the application of Article 67(3) EPC for European Patent Application Serial No. 16780482.2 (dated Jan. 24, 2018).
Communication of European publication number and information on the application of Article 67(3) EPC for European Patent Application Serial No. 16780481.4 (dated Jan. 24, 2018).
"Time-Sensitive Networking," Wikipedia, the free encyclopedia, https://en.wikipedia.org/wiki/Time-Sensitive_Networking, pp. 1-7 (Aug. 29, 2017).
Final Office Action for U.S. Appl. No. 15/482,672 (dated Apr. 2, 2019).
Communication of the extended European search report for European Patent Application Serial No. 16849136.3 (dated Feb. 20, 2019).
Bhunia et al., "Hardware Trojan Attacks: Threat Analysis and Countermeasures," Proceedings of the IEEE, vol. 102, No. 8, pp. 1-20 (Aug. 2014).
Decision to grant a European patent pursuant to Article 97(1) EPC for European Patent Application Serial No. 16849136.3 (dated Apr. 17, 2020).
Communication under Rule 71(3) EPC Intention to Grant for European Patent Application Serial No. 16 849 136.3 (dated Dec. 12, 2019).

\* cited by examiner

US 10,965,392 B2

ACTIVE NETWORK TAP SUPPORTING TIME SENSITIVE NETWORK (TSN) STANDARDS

TECHNICAL FIELD

The subject matter described herein relates to tapping or monitoring messages in time sensitive networks. More particularly, the subject matter described herein relates to an active network tap capable of monitoring messages in time sensitive networks without violating the timing requirements of the TSN protocols.

BACKGROUND

Network taps are devices that provide signals or packets from a network to one or more network tools, for example, for security or performance monitoring purposes. There are two main categories of network taps: passive taps and active taps. Passive taps split the energy (either electrical or optical energy) on the wire. One of the outputs of the tap is connected to the original destination, and the other output is connected to a monitoring port. Passive taps do not introduce significant delay in the signal provided to the original destination because there is no active signal processing performed on the tapped signal.

Active network taps use physical layer chips (PHYs) or amplifiers to improve signal quality and provide a tap signal of high quality without reducing the quality of the signal being tapped. For copper twisted pair network media, active taps are commonly used. The most common configuration of active tap is a quad PHY or equivalent with four physical layer chips. FIG. 1 illustrates an example of a conventional quad PHY network tap. In FIG. 1, quad PHY network tap 100 includes PHYs 102 and 104 connected to network ports and PHYs 106 and 108 connected to monitor ports. The 4 PHY devices 102, 104, 106, and 108 can be in separate packages or can be packaged together in a multi-port PHY device. The network ports receive traffic from and provide traffic to the network being monitored. The monitor ports provide traffic to network tools.

In the configuration illustrated in FIG. 1, traffic received on network port A passes through PHY 102 is transmitted back to the network through PHY 104 and network port B. Each of PHYs 102 and 104 can introduce as much as several microseconds of delay of the traffic forwarded from network port A to network port B. The traffic received on network port A that is processed by PHY 102 is also provided to PHY 106 for forwarding on monitor port A. Traffic received on network port B passes through PHY 104 and 102 before being forwarded on network port A. As with the traffic received on network port A, PHY 104 and PHY 102 can each insert as much as several microseconds of delay of the traffic forwarded from network port B to network port A. The traffic received on network port B that is processed by PHY 104 is also provided to PHY 108 for forwarding on monitor port B.

One problem with the tap scenario illustrated in FIG. 1 is that the delay caused by PHYs 102 and 104 can exceed the delay requirements of time sensitive networks. For example, the IEEE Standard 802.1AS assumes a fixed delay between peers. As a result, a tap should insert as little jitter in signals traversing its network interfaces as possible. In addition, 802.1AS has a limit on the propagation delay between peers. This limit is called the neighbor propagation delay threshold. If this limit is exceeded, it is assumed that there is a non-802.1AS compliant device in the path and 802.1AS support may be deactivated.

Low latency taps are available, but even low latency taps can cause delay that exceeds the thresholds of time sensitive network standards. For example, in automotive networks, the neighbor propagation delay thresholds can be 600 nanoseconds or 800 nanoseconds, which may be exceeded by even low latency network taps.

Accordingly, there exists a need for an active network tap that supports a time sensitive network standard.

SUMMARY

The subject matter described herein includes a method for providing an active tap compliant with the time sensitive network standards. The method includes scanning received frames on an ingress network port of an active network tap to identify timing synchronization messages of targeted message types. The method further includes modifying at least one timing value in the timing synchronization message to account for delay introduced by the active network tap. The method further includes forwarding the timing synchronization message with the at least one modified timing value to a destination time sensitive network node via an egress network port of the active network tap.

As used herein, the term "time sensitive network" refers to a network where nodes synchronize their timing with other nodes by exchange of timing synchronization messages via the network. The term "time sensitive network standards" refers to standards defining protocols for exchange of timing synchronization messages and synchronizing timing between nodes. Examples of time sensitive network standards include 802.1AS, IEEE 1588, IEEE 1588v2, and other standards where timing is synchronized between nodes through exchange of timing synchronization messages.

Most "time sensitive network standards" propagate accurate time by having a time "master" send messages over the network and sharing the exact time that the message was sent with the "slave" recipient of the message. In addition, the cable delay between the "master" and "slave" is determined. With the information indicating when the message was transmitted and the cable delay, the "slave" receiver can calculate the time (in the "master's" time domain) when the message was received (effectively now having a time synchronized to the master).

In one example, identifying a timing synchronization message of a targeted message type includes identifying a sync or sync follow up message and adding the latency of the active network tap to a correction field or an origin timestamp field of the sync or sync follow up message.

In another example, identifying a timing synchronization message of a targeted message type includes identifying a propagation delay response message and subtracting a latency of the network tap from a request receipt timestamp field or a correction field of the propagation delay response message.

In yet another example, identifying a timing synchronization message of a targeted message type includes identifying a propagation delay response or propagation delay response follow up message and adding a latency of the active network tap to a response origin timestamp field of the propagation delay response or response follow up message.

In yet another example, modifying the timing value to account for the delay introduced by the network tap includes modifying the timing value to reduce an effect of the delay introduced by the active network tap on timing synchronization calculations in the time sensitive network.

In yet another example, the method for providing an active network tap compliant with time sensitive network standards includes providing a copy of traffic received on the ingress network port of the active network tap to a monitor port of the active network tap.

In yet another example modifying the timing value to account for delay introduced by the active network tap includes modifying the timing value to account for delays caused by at least one physical layer chip of the active network tap.

In yet another example, modifying the timing value to account for delays caused by at least one physical layer chip includes adding an estimated delay value to the timing value, where the estimated delay value comprises a sum of an estimated delay added to processing of the timing synchronization message by a first physical layer chip associated with the ingress network port and an delay added to processing of the timing synchronization message by a second physical layer chip associated with the egress network port.

In yet another example, the active network tap comprises a quad physical layer chip (PHY) network tap including first and second PHYs respectively associated with the ingress network port and the egress network port and second and third PHYs respective associated with first and second monitor ports.

According to another aspect of the subject matter described herein, a system for providing an active tap compliant with time sensitive network standards is described. The system includes an active network tap. The active network tap includes a first physical layer chip (PHY) associated with an ingress network port. The active network tap further includes a second PHY associated with an egress network port. The active network tap further includes a third PHY associated with a first monitor port. The active network tap further includes timing manipulator logic for scanning received frames on the ingress network port of an active network tap to identify timing synchronization messages of targeted message types, identifying a timing synchronization message of a targeted message type, modifying at least one timing value in the timing synchronization message to account for delay introduced by the active network tap, and forwarding the timing synchronization message with the at least one modified timing value to a destination time sensitive network node via the egress network port of the active network tap.

In one example, the timing manipulator logic is configured to identify a sync or sync follow up message as being of a targeted message type and add a latency of the active network tap to a correction field or an origin timestamp field of the sync or sync follow up message.

In another example, the timing manipulator logic is configured to identify a propagation delay response message as being of a targeted message type and subtract a latency of the network tap from a request receipt timestamp field of the propagation delay response message.

In yet another example, the timing manipulator logic is configured to identify a propagation delay response or propagation delay response follow up message as being of a targeted message type and add a latency of the active network tap to a response origin timestamp field or a correction field of the propagation delay response or response follow up message.

In yet another example, the timing manipulator logic is configured to modify the timing value to reduce an effect of the delay introduced by the active network tap on timing synchronization calculations in the time sensitive network.

In yet another example, the first PHY of the active network tap is configured to provide a copy of traffic received on the ingress network port of the active network tap to the first monitor port of the active network tap.

In yet another example, the timing manipulator is configured to, in modifying the timing value to account for delay introduced by the active network tap, modify the timing value to account for delays caused by the first and second PHYs of the active network tap.

In yet another example, the timing manipulator is configured to, in modifying the timing value, add an estimated delay value to the timing value, where the estimated delay value comprises a sum of an estimated delay added to processing of the timing synchronization message by the first PHY and an estimated delay added to processing of the timing synchronization message by the second PHY.

In yet another example, the active network tap comprises a quad PHY network tap including the first and second PHYs respectively associated with the ingress network port, the third PHYs with the first monitor port, and a fourth PHY associated with a second monitor port.

In yet another example, the timing manipulator logic includes at least one processor, a targeted message location module for performing the scanning and implemented by the at least one processor, and a timing value adjustment module for modifying the timing value and implemented by the at least one processor.

According to yet another aspect of the subject matter described herein, a non-transitory computer readable medium having stored thereon executable instructions that when executed by a processor of a computer controls the computer to perform steps. The steps include scanning received frames on an ingress network port of an active network tap to identify timing synchronization messages of targeted message types. The steps further include identifying a timing synchronization message of a targeted message type. The steps further include modifying at least one timing value in the timing synchronization message to account for delay introduced by the active network tap. The steps further include forwarding the timing synchronization message with the at least one modified timing value to a destination time sensitive network node via an egress network port of the active network tap.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 2:
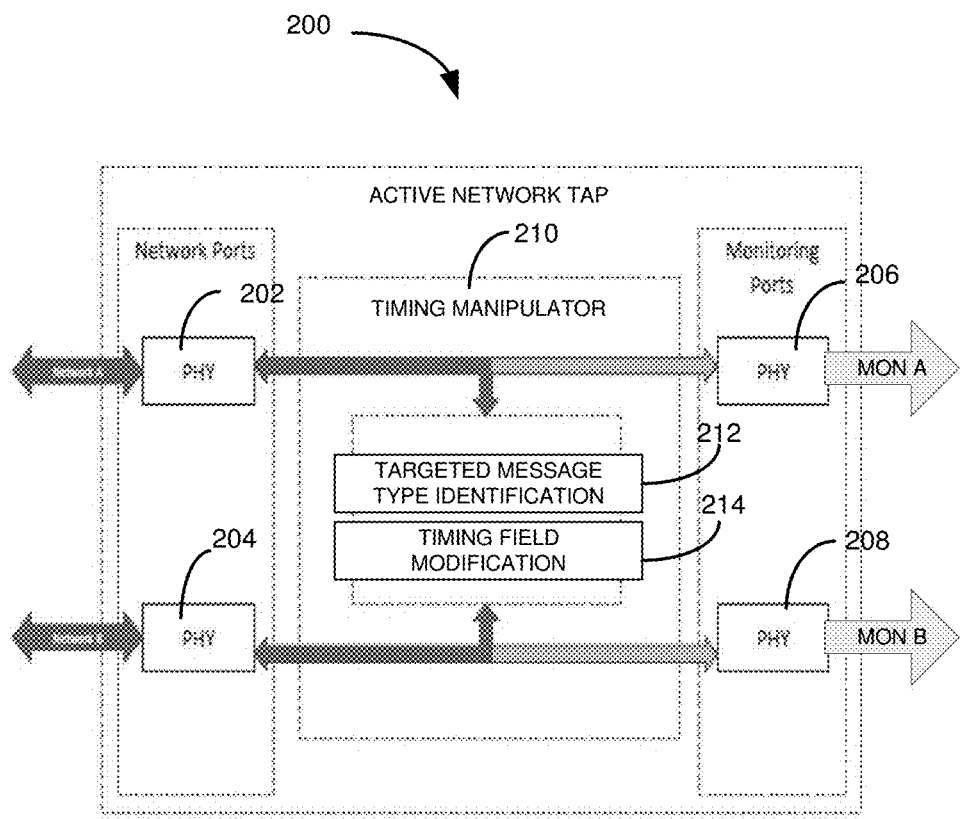
FIG. 2 is a block diagram of an active network tap including timing manipulator logic.

As stated above, one problem with conventional active network taps is they may cause delays in messages and these delays are not compliant with TSN standards, such as 802.1AS. To avoid this difficulty, the subject matter described herein includes a network tap with timing manipulator logic that modifies time values in timing synchronization messages received from other network nodes to account for the delay caused by the network tap. FIG. 2 is a block diagram of an active network tap with a timing manipulator for identifying timing synchronization messages of targeted message types, modifying timing values in the messages to account for delay caused by the network tap, and for forwarding the timing synchronization messages to destination TSN network nodes.

Figure 1:
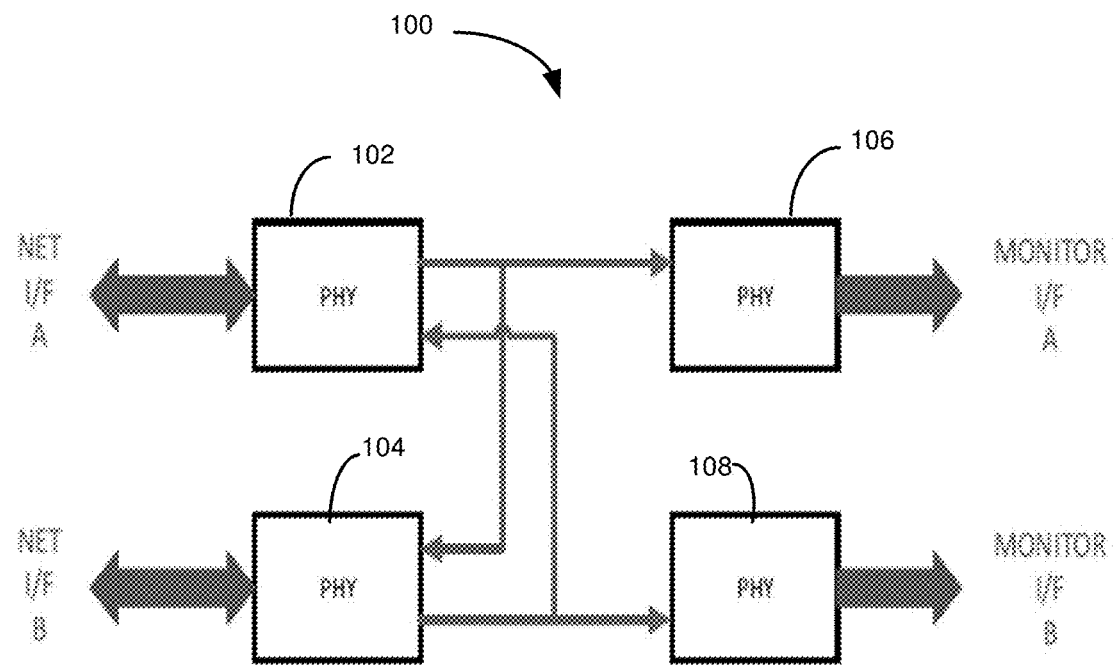
FIG. 1 is a block diagram of a conventional active network tap.

Referring to FIG. 2, active tap 200 includes PHYs 202 and 204 associated with network ports A and B. Active tap also includes PHYs 206 and 208 associated with monitor ports A and B. Network traffic received on network port A passes through PHY 202 where the traffic is split or copied into two different streams. One stream of traffic is forwarded to network port B via PHY 204. The other stream of traffic is provided to monitor port A via PHY 206. As with the tap illustrated in FIG. 1, PHYs 202 and 204 introduce delay in the traffic that is forwarded between the network ports. Similarly, traffic received on network port B travels through PHY 204 where the traffic is split or copied into two different streams. One stream is provided back to the monitored network via PHY 202. The other stream is provided to monitor port B via PHY 206. PHYs 204 and 202 introduce delay in the traffic forwarded between the network ports.

In order to account for the delay introduced by PHYs 202 and 204 in traffic forwarded between network ports, active tap 200 includes timing manipulator logic 210 that identifies timing synchronization messages whose time values need to be modified and modifies the time values in the messages to account for delay introduced by the tap before forwarding the packets to the egress network port. In order to identify timing synchronization messages whose time values need to be modified, timing manipulator logic 210 may scan traffic received on the network ports and locate frames. The frames may be analyzed to determine whether they contain a timing synchronization message of a type that requires modification. Examples of timing synchronization messages that require modification include IEEE 1588 or 802.1AS messages, such as sync, sync follow up, propagation delay request, propagation delay response, and propagation delay response follow up messages. Once timing manipulator logic 210 receives a message that is identified as being a targeted message type, timing manipulator logic 210 may modify a timing value in the message to account for the delay caused by PHYs 202 and 204. Examples of message types and fields that will be modified are described in detail below.

In FIG. 2, timing manipulator logic 210 includes a targeted message type identification module 212 and a timing field modification module 214. Targeted message type identification module 212 may scan received frames to identify timing synchronization messages of the types that require modification to one or more timing fields in the message. Timing field modification module 214 modifies timing values in the appropriate fields to account for delay introduced by network tap 200. It is understood that timing manipulator logic 210 may include or be implemented by at least one processor, where a processor can be a general-purpose microprocessor, a field programmable gate array (FPGA) or an application-specific integrated circuit (ASIC).

Figure 3:
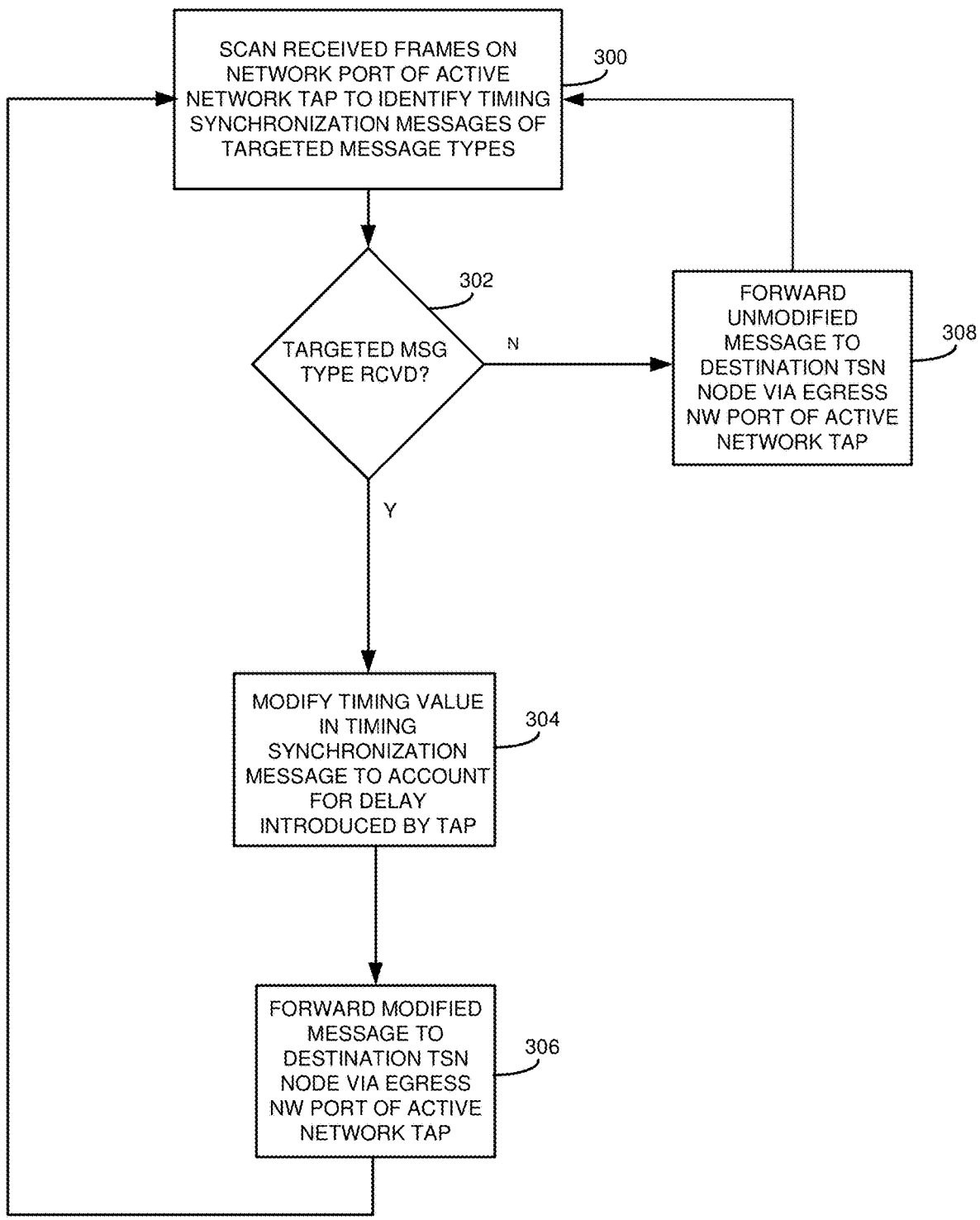
FIG. 3 is a flow chart of a process for providing an active network tap that is compliant with a TSN standard.

FIG. 3 is a flow chart illustrating an exemplary process that may be implemented by timing manipulator logic 210 illustrated in FIG. 2. Referring to FIG. 3, in steps 300 and 302, network traffic received on a first network port of an active network tap is scanned to identify timing synchronization messages of targeted message types. Examples of timing synchronization messages of targeted types include those listed above.

In step 302, if a targeted message type is not identified, control proceeds to step 308 where the received message is forwarded to a destination TSN node via a second network port of the network tap. In FIG. 2, messages received on network port A may be forwarded on network port B. Similarly, messages received on network port B may be forwarded on network port A. It is understood that copies of the received traffic will also be provided to monitor ports A and B.

In step 302, if a targeted message type is identified, control proceeds to step 304 where timing manipulator logic 210 modifies one or more timing values in the message to reduce the effect of the delay introduced by the network tap on timing synchronization operations. The following message types and values may be modified by timing manipulator logic 210:

1. On any 802.1AS sync or sync follow-up message passing through the network tap, the tap's latency may be added to the origin timestamp or correction fields;
2. On any 802.1AS propagation delay response message, the tap's latency may be subtracted from the request receipt timestamp field;
3. On any 802.1AS propagation delay response and propagation delay response follow up message, the tap's latency may be added to the response origin timestamp or correction fields.

In step 306, the timing synchronization message with the modified timing value(s) is forwarded to a destination TSN node via a second network port of the network tap. In FIG. 2, messages received on network port A may be forwarded on network port B. Similarly, messages received on network port B may be forwarded on network port A. It is understood that copies of the received traffic will also be provided to monitor ports A and B.

The effect of timing manipulator logic 210 is that the calculated propagation delay between network ports will have the propagation delay caused by the tap canceled out. In other words, the propagation delay calculated according to the TSN standard will be equal or substantially equal to the propagation delay that would have been calculated without the tap being present. Accordingly, the tap will not have any effect on timing synchronization in the network. Timing manipulator logic 210 will make it seem as if a sync message was transmitted at a time equal to the tap latency added to the time that the sync message was transmitted. This will cause the receiving time sensitive network node to calculate the correct time value.

Figure 4A:
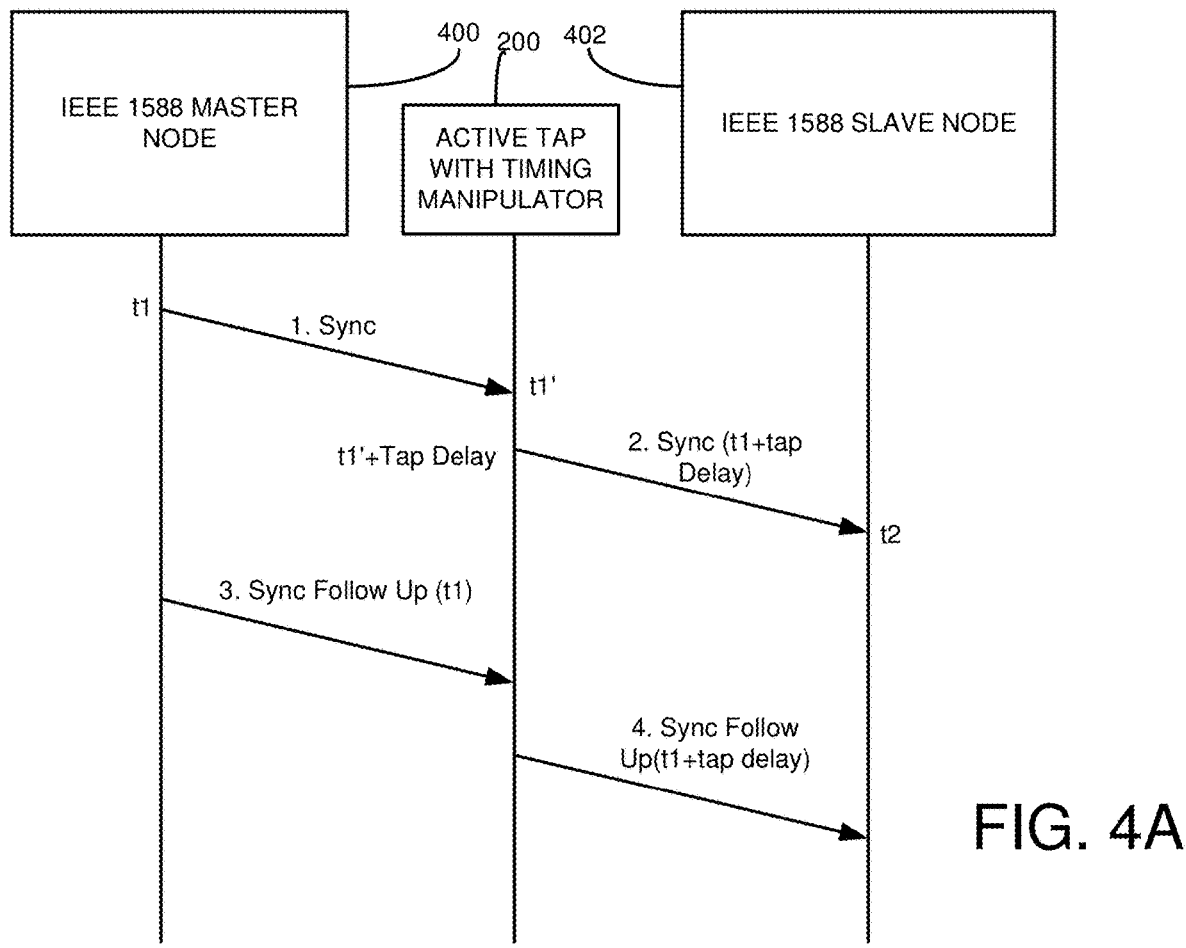
FIG. 4A is a timing diagram illustrating exemplary sync timing synchronization messages that may be exchanged between TSN nodes.
Figure 4B:
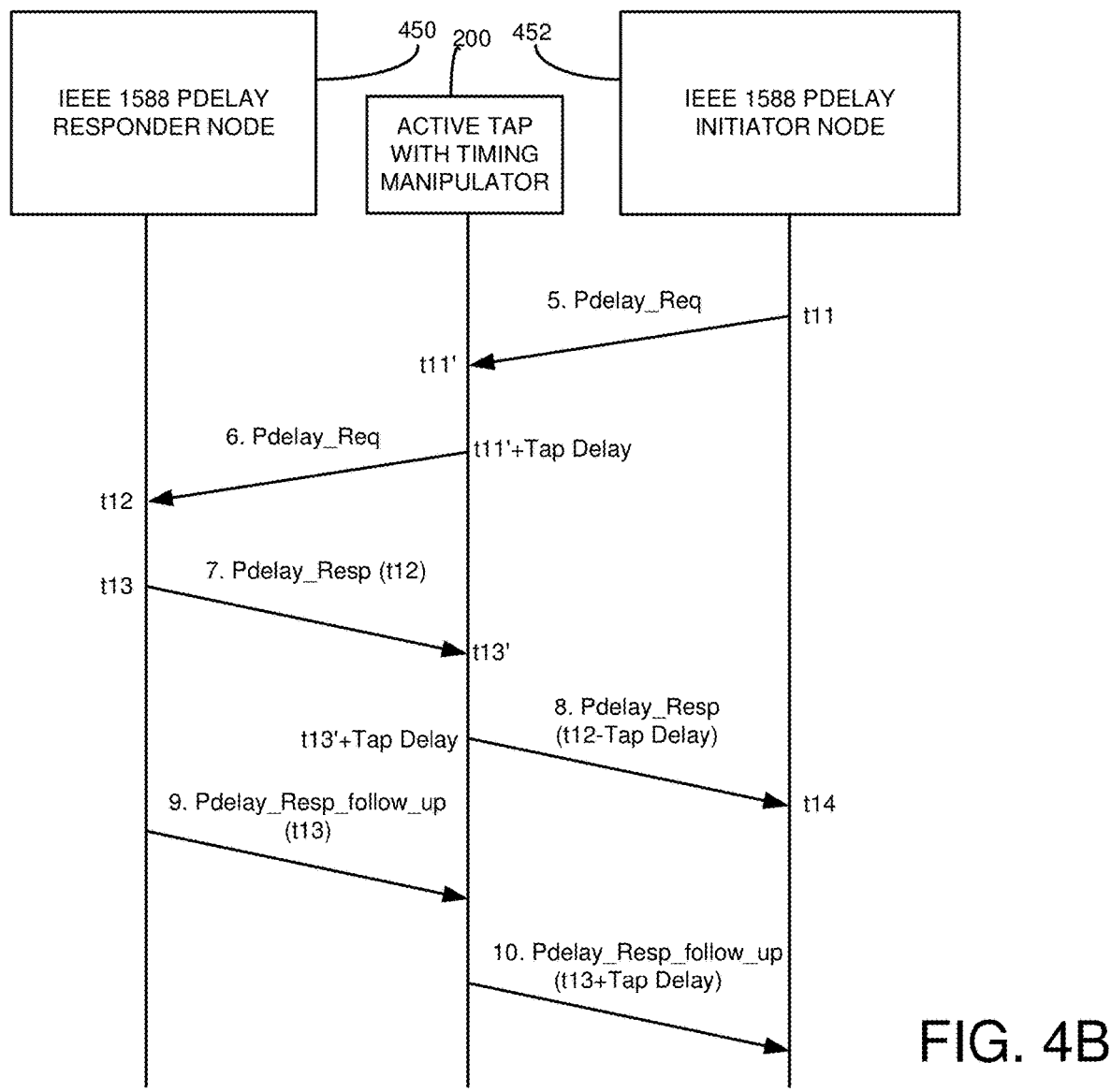
FIG. 4B is a timing diagram illustrating exemplary propagation delay timing synchronization messages that may be exchanged between TSN nodes.

FIGS. 4A and 4B are message flow diagrams illustrating exemplary timing synchronization messages and modification of time values by active tap 200 with timing manipulator 208. Referring to FIG. 4A, example messages exchanged between an IEEE 1588 master node 400 and IEEE 1588 slave node 402 are illustrated. IEEE 1588 is also referred to as the precision time protocol. The 802.1AS Standard is a 1588 profile based on version 2 of the IEEE 1588 Standard and shares common timing synchronization messages with the IEEE 1588 v2 Standard. The term "timing synchronization message" as used herein, is intended to refer to any IEEE 802.1AS timing synchronization message, IEEE 1588 timing synchronization message, or equivalent message that is used to synchronize timing between network nodes.

In FIG. 4A, active tap 200 is located in-line between IEEE 1588 master node 400 and IEEE 1588 slave node 402. In IEEE 1588, the master node is the node that contains a clock value either internally generated or obtained from an accurate clock source to which other nodes synchronize. A slave node is a node that synchronizes its clock to that of a master node. In line 1 of the message flow diagram, IEEE 1588 master node 400 transmits a sync message to IEEE 1588 slave node 402. Network tap 200 receives this message at time t1' (which is t1 plus the cable delay between master node 400 and network tap 200). Network tap 200 with timing manipulator logic 210 intercepts the sync message and, in line 2, retransmits the sync message at a time equal to t1'+tap delay. Before transmitting the sync message, timing manipulator logic 210 adds the tap delay to the correction field of the sync message.

In line 3 of the message flow diagram, IEEE 1588 master node 400 sends a sync follow up message with the timestamp t1 of transmission of the sync message to IEEE 1588 slave node 402. Active tap 200 intercepts the sync follow up message and modifies the correction field of the sync follow up message to include the tap latency. In line 4 of the message flow diagram, active tap 200 forwards the sync follow up with the modified correction field to IEEE 1588 slave node 402.

Referring to FIG. 4B, example messages exchanged between an IEEE 1588 node 452, which is originating a pdelay_request, and IEEE 1588 node 450, which is responding the pdelay_request, are illustrated. The pdelay_request originating node may be either an IEEE 1588 master or slave. If the pdelay_request originating node is an IEEE 1588 master, then the pdelay_request responding node is an IEEE 1588 slave. If the pdelay_request originating node is an IEEE 1588 slave, then the pdelay_request responding node is an IEEE 1588 master. Node 450 may be the same as node 402 when node 450 is a slave. Node 450 may be the same as node 400 when node 450 is a master. Similarly, node 452 may be the same as node 402 when node 452 is a slave. Node 452 may be the same as node 400 when node 452 is a master.

In line 5 of the message flow diagram, IEEE 1588 node 452 sends a propagation delay request message to IEEE 1588 node 450. IEEE 1588 node 452 records the transmission time t11 of the propagation delay request message. Active tap 200 intercepts the propagation delay request message and forwards the propagation delay request message in line 6 without modification to IEEE 1588 node 450. IEEE 1588 node 450 records the timestamp t12 of receipt of the propagation delay request message.

In line 7 of the message flow diagram, IEEE 1588 node 450 transmits a propagation delay response message to IEEE 1588 node 452. Active tap 200 intercepts the propagation delay response message and adds the tap delay to the response origin timestamp field of the propagation delay response message. Active tap 200 may also subtract the tap's latency from the request receipt timestamp field of the propagation delay response message. In the line 8 of the message flow diagram, active tap 200 transmits the propagation delay response message with the modified fields to IEEE 1588 node 452.

IEEE 1588 node 450 may optionally send a Pdelay_Resp_follow_up message, as shown in line 9 of FIG. 4B. Active tap 200 intercepts the propagation delay response follow up message and subtracts the tap's latency from the request receipt timestamp field of the propagation delay response follow up message. In the line 10 of the message flow diagram, active tap 200 transmits the propagation delay response follow up message with the modified fields to IEEE 1588 node 452.

IEEE 1588 node 452 then calculates the propagation delay using the following formula:

$$\text{Prop Delay} = ((t14 - t11) - ((t13 + \text{Tap Delay}) - (t12 - \text{Tap Delay})))/2$$
$$= (t14 + t12 - t11 - t13)/2 - \text{Tap Delay}$$

As can be seen from this formula, by adding the tap delay to the appropriate field, active tap 200 reduces the effect of tap latency on propagation delay calculations in a time sensitive network.

Figure 5:
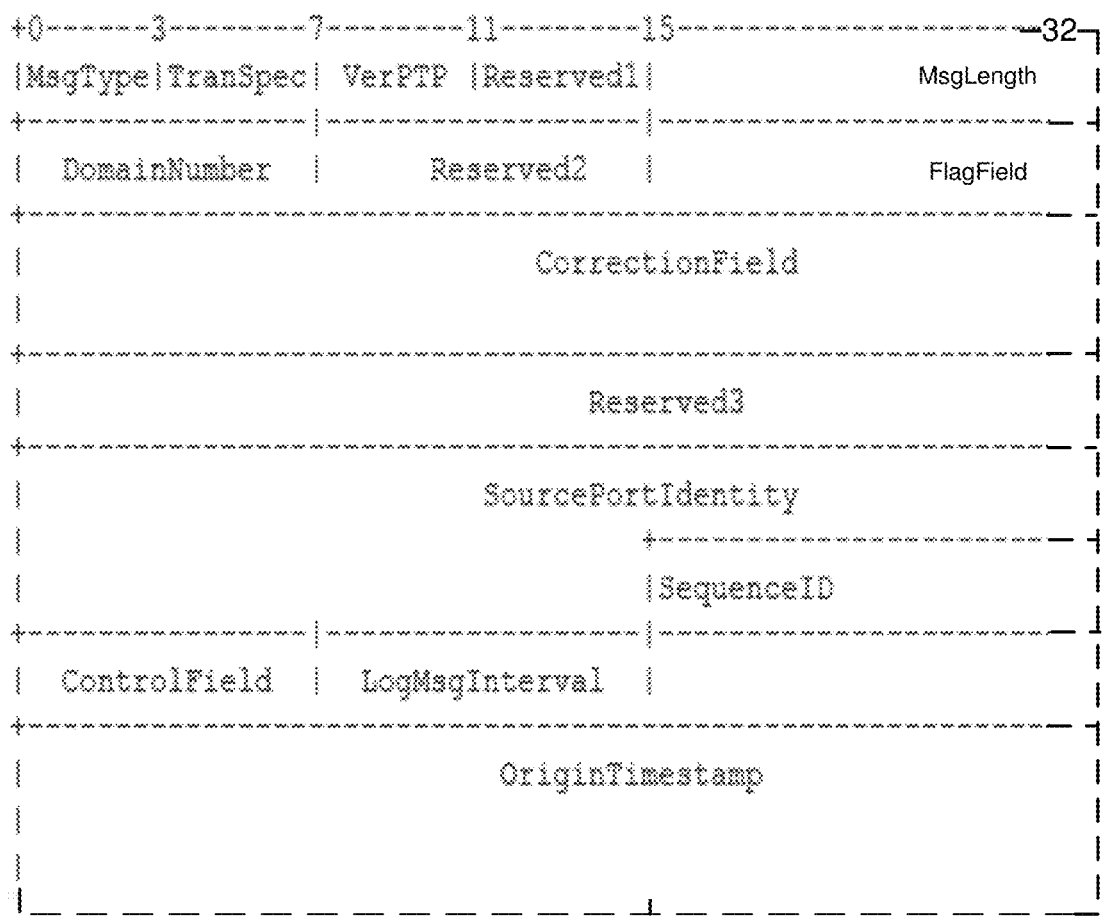
FIG. 5 is a block diagram illustrating an exemplary format for IEEE 1588 sync or delay request message with timing values that may be modified by a timing manipulator of an active network tap.

FIG. 5 is a block diagram of an exemplary IEEE 1588 version 2 sync or propagation delay request message. Table 1 shown below describes the parameter values included in each of the fields that are present in the sync or propagation delay request message. As set forth above, in other message types, the effect of tap delay can be reduced by modifying the origin timestamp field. The formats of the other message types referenced herein are similar to that illustrated in FIG. 5.

TABLE 1

Sync and Propagation Delay Request Message Format

| Field | Length | Description |
| --- | --- | --- |
| TranSpec | 4 bits | The transportSpecific field may be used by a lower layer transport protocol. |
| MsgType | 4 bits | The value messageType shall indicate the type of the message. |
| Reserved1 | 4 bits | Reserved fields shall be transmitted with the all |

TABLE 1-continued

Sync and Propagation Delay Request Message Format

| Field | Length | Description |
|---|---|---|
| | | bits of the field 0 and ignored by the receiver. |
| VerPTP | 4 bits | PTP protocol version. |
| MsgLength | 2 bytes | The value of the messageLength shall be the total number of octets that form the PTP message. The counted octets start with the first octet of the header and include and terminate with the last octet of any suffix or, if there are no suffix members with the last octet of the message. |
| DomainNumber | 1 byte | Domain number that the clock belongs to. |
| Reserved2 | 1 byte | Reserved fields shall be transmitted with the all bits of the field 0 and ignored by the receiver. |
| FlagField | 2 bytes | The value of the bits of the flagField array shall be as defined shown in Table 1. |
| CorrectionField | 64 bits | PTP provides mechanisms for conveying timestamps generated at the sources of event messages along with any corrections needed to ensure that the recipient at the event message receives the most accurate timestamp possible. The actual distribution of the time information between the originTimestamp or preciseOriginTimestamp and the correctionField fields is implementation dependent. |
| Reserved3 | 32 bits | Reserved fields shall be transmitted with the all bits of the field 0 and ignored by the receiver. |
| SourcePortIdentity | | The source and the port that sent the message. |
| SequenceID | 2 bytes | Sequence ID of the message. |
| ControlField | 1 byte | 0x00: Sync<br>0x01: Delay_Req |
| LogMsgInterval | 1 byte | Indicates how long to send the PTP message. |
| OriginTimestamp | 10 bytes | Origin Timestamp. |

From Table 1, the correction field carries values used to correct timestamps and the origin timestamp field carries the origin timestamp of the message. By adding the tap delay to the correction field, active tap 200 reduces the effect of the tap latency on propagation delay calculations.

In general, active tap 200 modifies a timing value in a received timing synchronization message to account for delays caused by at least one physical layer chip of the network tap. In the quad PHY network tap illustrated in FIG. 2, modifying a timing value includes adding an estimated delay value to a timing field of the timing synchronization message, where the estimated delay value comprises a sum of estimated delay added to processing of a timing synchronization message by a first physical layer chip associated with the ingress network port and an estimated delay added to processing of the timing synchronization messaged by a second physical layer chip associated with the egress network port. In FIG. 2, for traffic received on network port A, the estimated timing value would be the sum of the estimated delay caused by PHY 202 and the estimated delay caused by PHY 204. For traffic received on network port B, the estimated delay added to the timing field would also by the sum of the estimated delay caused by PHY 202 and the estimated delay caused by PHY 204. The delay estimate can be determined empirically by running test traffic or live traffic through the network tap and measuring the delay experienced by traffic traversing the network ports.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for providing an active tap compliant with time sensitive network standards, the method comprising: at an active network tap located between a first IEEE 1588 node and a second IEEE 1588 node:
intercepting received frames transmitted from the first IEEE 1588 node to the second IEEE 1588 node on an ingress network port of the active network tap to identify timing synchronization messages of targeted message types;
identifying a timing synchronization message of a targeted message type;
modifying at least one timing value in the timing synchronization message to account for delay introduced by the active network tap, wherein modifying the at least one timing value includes modifying the at least one timing value based on an estimated delay value experienced by the timing synchronization message, wherein the estimated delay value is determined empirically by running test traffic or live traffic through the active network tap and measuring a delay experienced by traffic traversing the ingress network port and an egress network port of the active network tap; and
forwarding the timing synchronization message with the at least one modified timing value to the second IEEE 1588 node via the egress network port of the active network tap.

2. The method of claim 1 wherein identifying a timing synchronization message of a targeted message type includes identifying a sync or sync follow up message and wherein modifying at least one timing value in the timing synchronization message includes adding a latency of the active network tap to a correction field or an origin timestamp field of the sync or sync follow up message.

3. The method of claim 1 wherein identifying a timing synchronization message of a targeted message type includes identifying a propagation delay response message and wherein modifying at least one timing value in the timing synchronization message includes subtracting a latency of the active network tap from a request receipt timestamp field of the propagation delay response message.

4. The method of claim 1 wherein identifying a timing synchronization message of a targeted message type includes identifying a propagation delay response or propagation delay response follow up message and wherein modifying at least one timing value in the timing synchronization message includes adding a latency of the active network tap to a response origin timestamp field or a correction field of the propagation delay response or response follow up message.

5. The method of claim 1 wherein modifying the at least one timing value to account for the delay introduced by the active network tap includes modifying the at least one timing value to reduce an effect of the delay introduced by the active network tap on timing synchronization calculations in a time sensitive network.

6. The method of claim 1, further comprising providing a copy of traffic received on the ingress network port of the active network tap to a monitor port of the active network tap.

7. The method of claim 1 wherein modifying the at least one timing value to account for delay introduced by the active network tap includes modifying the at least one timing value to account for delays caused by at least one physical layer chip of the active network tap.

8. The method of claim 7 wherein modifying the at least one timing value to account for delays caused by at least one physical layer chip includes adding the estimated delay value to the at least one timing value, where the estimated delay value comprises a sum of an estimated delay added to processing of the timing synchronization message by a first physical layer chip associated with the ingress network port and an estimated delay added to processing of the timing synchronization message by a second physical layer chip associated with the egress network port.

9. The method of claim 1 wherein the active network tap comprises a quad physical layer chip (PHY) network tap including first and second PHYs respectively associated with the ingress network port and the egress network port and third and fourth PHYs respectively associated with first and second monitor ports.

10. A system for providing an active tap compliant with time sensitive network standards, the system comprising:
an active network tap configured to operate between a first IEEE 1588 node and a second IEEE 1588 node, the active network tap including:
a first physical layer chip (PHY) associated with an ingress network port;
a second PHY associated with an egress network port;
a third PHY associated with a first monitor port; and
timing manipulator logic for:
intercepting received frames transmitted from the first IEEE 1588 node to the second IEEE 1588 node on the ingress network port of the active network tap to identify timing synchronization messages of targeted message types;
identifying a timing synchronization message of a targeted message type;
modifying at least one timing value in the timing synchronization message to account for delay introduced by the active network tap, wherein modifying the at least one timing value includes modifying the at least one timing value based on an estimated delay value experienced by the timing synchronization message, wherein the estimated delay value is determined empirically by running test traffic or live traffic through the active network tap and measuring a delay experienced by traffic traversing the ingress network port and the egress network port of the active network tap; and
forwarding the timing synchronization message with the at least one modified timing value to the second IEEE 1588 node via the egress network port of the active network tap.

11. The system of claim 10 wherein the timing synchronization message identified by the timing manipulator logic as being of a targeted message type comprises a sync or sync follow up message and wherein the timing manipulator logic is configured to modify the at least one timing value by adding a latency of the active network tap to a correction field or an origin timestamp field of the sync or sync follow up message.

12. The system of claim 10 wherein the timing synchronization message identified by the timing manipulator logic as being of a targeted message type comprises a propagation delay response message and wherein the timing manipulator logic is configured to modify the at least one timing value by subtracting a latency of the active network tap from a request receipt timestamp field of the propagation delay response message.

13. The system of claim 10 wherein the timing synchronization message identified by the timing manipulator logic as being of a targeted message type comprises a propagation delay response or propagation delay response follow up message and wherein the timing manipulator logic is configured to modify the at least one timing value by adding a latency of the active network tap to a response origin timestamp field or an origin timestamp field of the propagation delay response or propagation delay response follow up message.

14. The system of claim 10 wherein modifying the at least one timing value to account for the delay introduced by the active network tap includes modifying the at least one timing value to reduce an effect of the delay introduced by the active network tap on timing synchronization calculations in a time sensitive network.

15. The system of claim 10 wherein the first PHY of the active network tap is configured to provide a copy of traffic received on the ingress network port of the active network tap to the first monitor port of the active network tap.

16. The system of claim 10 wherein, in modifying the at least one timing value to account for delay introduced by the active network tap, the timing manipulator logic is configured to modify the at least one timing value to account for delays caused by the first and second PHYs of the active network tap.

17. The system of claim 16 wherein, in modifying the at least one timing value, the timing manipulator logic is configured to add the estimated delay value to the at least one timing value, where the estimated delay value comprises a sum of an estimated delay added to processing of the timing synchronization message by the first PHY and an estimated delay added to processing of the timing synchronization message by the second PHY.

18. The system of claim 10 wherein the active network tap comprises a quad PHY network tap including the first and second PHYs respectively associated with the ingress network port and the egress network port, the third PHY with the first monitor port, and a fourth PHY associated with a second monitor port.

19. The system of claim 10 wherein the timing manipulator logic includes at least one processor, a targeted message type identification module for performing the intercepting and implemented by the at least one processor, and a timing value adjustment module for modifying the at least one timing value and implemented by the at least one processor.

20. A non-transitory computer readable medium having stored thereon executable instructions that when executed by a processor of a computer control the computer to perform steps comprising:

at an active network tap located between a first IEEE 1588 node and a second IEEE 1588 node:

intercepting received frames transmitted from the first IEEE 1588 node to the second IEEE 1588 node on an ingress network port of the active network tap to identify timing synchronization messages of targeted message types;

identifying a timing synchronization message of a targeted message type;

modifying at least one timing value in the timing synchronization message to account for delay introduced by the active network tap, wherein modifying the at least one timing value includes modifying the at least one timing value based on an estimated delay value experienced by the timing synchronization message, wherein the estimated delay value is determined empirically by running test traffic or live traffic through the active network tap and measuring a delay experienced by traffic traversing the ingress network port and an egress network port of the active network tap; and forwarding the timing synchronization message with the at least one modified timing value to the second IEEE 1588 node via the egress network port of the active network tap.

* * * * *